DIVIDEND DIVISOR ALIGNING MECHANISM

Original Filed Dec. 13, 1950 8 Sheets-Sheet 1

INVENTORS
GEORGE W. HOPKINS &
WARDELL E. SHACKLEFORD

BY [signature]
ATTORNEY

Oct. 15, 1957 G. W. HOPKINS ET AL 2,809,786

DIVIDEND DIVISOR ALIGNING MECHANISM

Original Filed Dec. 13, 1950 8 Sheets-Sheet 2

INVENTORS
GEORGE W. HOPKINS &
WARDELL E. SHACKLEFORD

BY [signature]
ATTORNEY

Oct. 15, 1957 G. W. HOPKINS ET AL 2,809,786

DIVIDEND DIVISOR ALIGNING MECHANISM

Original Filed Dec. 13, 1950 8 Sheets-Sheet 3

INVENTORS
GEORGE W. HOPKINS &
WARDELL E. SHACKLEFORD

BY [signature]
ATTORNEY

Oct. 15, 1957 G. W. HOPKINS ET AL 2,809,786

DIVIDEND DIVISOR ALIGNING MECHANISM

Original Filed Dec. 13, 1950 8 Sheets-Sheet 4

INVENTORS
GEORGE W. HOPKINS
WARDELL E. SHACKLEFORD
BY [signature]
ATTORNEY

DIVIDEND DIVISOR ALIGNING MECHANISM

Original Filed Dec. 13, 1950 8 Sheets-Sheet 5

INVENTORS
GEORGE W. HOPKINS &
WARDELL E. SHACKLEFORD
BY [signature]
ATTORNEY

DIVIDEND DIVISOR ALIGNING MECHANISM

Original Filed Dec. 13, 1950

INVENTORS
GEORGE W. HOPKINS &
WARDELL E. SHACKLEFORD
BY [signature]
ATTORNEY

DIVIDEND DIVISOR ALIGNING MECHANISM

Original Filed Dec. 13, 1950

INVENTORS
GEORGE W. HOPKINS &
WARDELL E. SHACKLEFORD

BY [signature]
ATTORNEY

Oct. 15, 1957 G. W. HOPKINS ET AL 2,809,786

DIVIDEND DIVISOR ALIGNING MECHANISM

Original Filed Dec. 13, 1950 8 Sheets-Sheet 8

INVENTORS
GEORGE W. HOPKINS &
WARDELL E. SHACKLEFORD

BY [signature]
ATTORNEY

United States Patent Office 2,809,786

Patented Oct. 15, 1957

2,809,786

DIVIDEND DIVISOR ALIGNING MECHANISM

George W. Hopkins, San Leandro, and Wardell E. Shackleford, Danville, Calif., assignors to Friden Calculating Machine Co., Inc., a corporation of California Continuation of abandoned application Serial No. 200,656, December 13, 1950. This application December 5, 1955, Serial No. 550,886

13 Claims. (Cl. 235—63)

This invention relates to a division mechanism for calculating machines, and more particularly to an improved method and means for automatically aligning the dividend and divisor in such a machine as part of an automatic division operation, and is a continuation of S. N. 200,656, filed December 13, 1950, now abandoned.

In performing division operations on calculating machines of the type having relatively shiftable dividend and divisor receiving devices, it has been necessary in the past for the operator of the machine to enter the dividend and divisor factors into the machine and then to manually control the shift of the factor receiving devices relative to one another until the factors are brought into proper alignment before beginning an automatic division operation. The division mechanism is then set into operation by manipulation of a suitable control key or lever and the machine proceeds to divide the dividend by the divisor in a fully automatic manner without requiring any further attention on the part of the operator. The instant invention deals with an improved method and means for rendering the operation of such a calculating machine more completely automatic by causing the dividend and divisor to be properly aligned prior to the outset of the division operation proper. In describing the construction and operation of the instant invention, the terms "right shift" and "rightmost or extreme right end position" refer to the carriage shift operation as viewed from the operator's normal position in front of the machine keyboard.

It is an important object of the present invention, therefore, to provide an improved method and means for automatically delaying the initiation of an automatic division operation when the highest order of the dividend factor lies to the left of the highest order of the divisor factor, until the factors have been relatively shifted to a predetermined initiatory position.

It is also an object of the present invention to provide an improved method and means for first aligning the dividend and divisor factors in a calculating machine by causing the register carriage thereof to be shifted automatically to a right-hand terminal position as a first phase of the operation of the automatic division mechanism of the machine.

It is another object of the invention to provide an improved method and means for automatically aligning the dividend and divisor factors in a calculating machine and then dividing the former by the latter in an uninterrupted series of sequential operations by causing the machine to automatically shift the register carriage to a right-hand terminal position and by delaying operation of the automatic division mechanism thereof until after the right shift operation has been completed.

It is a further object of the invention to provide an improved method and means of aligning preselected dividend and divisor factors in a calculating machine and then dividing the former by the latter as part of a single continuous operation by automatically engaging and locking the carriage shift mechanism of the machine in its right shift position as the initial operation of the automatic division mechanism, and then automatically terminating the right shift operation and concurrently initiating operation of the automatic division mechanism after the shiftable carriage has reached a preselected right-hand position.

It is also an object of the instant invention to provide improved mechanism for automatically carrying out a division operation by first causing the carriage of a calculating machine to be shifted continuously toward the right, terminating the right carriage shift operation automatically after the carriage has reached a predetermined right-hand position, and then automatically tripping off operation of the division mechanism of the machine for causing ordinal shift of the carriage progressively toward the left and throughout the entire traverse of the carriage to first automatically align the division factors and then divide the dividend factor by the divisor factor in an uninterrupted series of sequential operations.

These and other objects of the invention will be apparent from the description which follows and the drawings which constitute a part hereof. Such further objects, advantages, and capabilities as will fully appear and as are inherently possessed by the device and the invention described herein, are intended to be included within the scope hereof.

While there is shown herein a preferred embodiment of our invention, it is to be understood that the same is illustrative of the invention and that the invention is capable of modification and change and comprehends other details of construction without departing from the spirit thereof, or the scope of the appended claims.

Referring to the drawings.

The machine to be hereinafter shown and described is basically the same as the calculating machine shown in U. S. Patent No. 2,229,889 issued to Carl M. F. Friden on January 28, 1941, and hence, only so much of the mechanism shown and described in the aforesaid patent will be set forth herein as is necessary in order to provide a complete understanding of the manner in which the present mechanism is related to that shown in the aforementioned patent.

*Selecting and actuating mechanisms*

Figure 1:
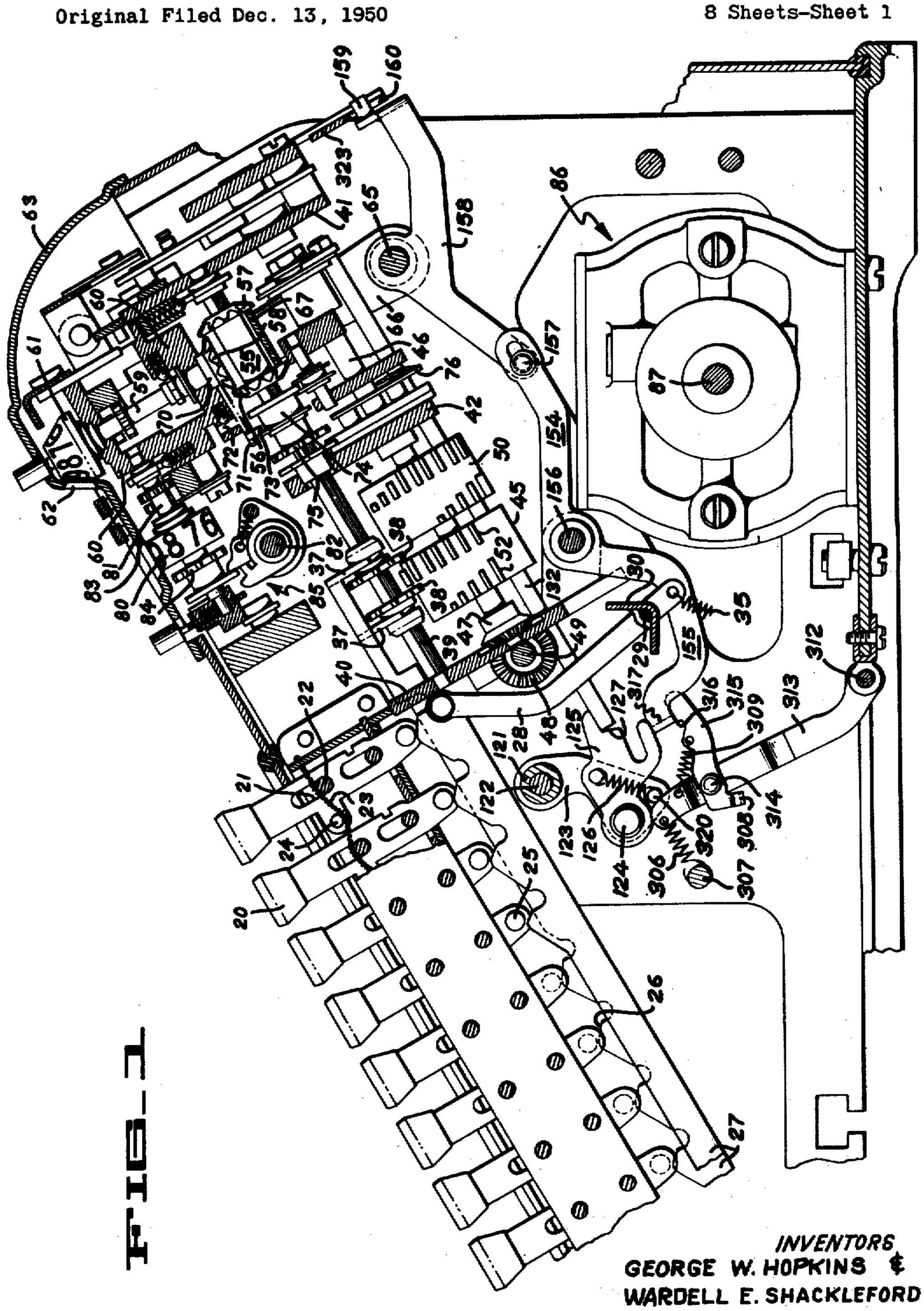
Fig. 1 is a longitudinal sectional elevation showing the right shift control mechanism and basic selecting and actuating mechanisms of the machine.

Referring now to Fig. 1 of the drawings there is shown a calculating machine provided with a plurality of rows or banks of amount keys 20, each of which is supported for endwise longitudinal movement by a pair of oblong slots 21 adapted to coact with the crossrods 22 which are transversely supported horizontally across the keyboard frame. The keys 20 in each bank are resiliently urged into their raised positions by means of a longitudinally extending coil spring 23 supported by the keyboard frame in such a manner that the spring is threaded over the upper crossrods 22 and under the pins 24 provided on the stems of the keys 20. The lower ends of the key stems carry studs 25 which are adapted to cooperate with inclined cam faces 26 provided on the longitudinally disposed selector bars 27. There are two such bars associated with each bank of keys in the keyboard, and each bar 27 is horizontally supported for endwise reciprocating movement below the keyboard by means of a pair of parallel links 28, the rearward supporting links shown in Fig. 1 being pivotally connected at their upper ends to their selector bars 27 and pivotally supported at their lower ends on a transverse rod 29 supported by an angle bar 30 which extends transversely across the machine.

Each of the selector bars 27 is resiliently urged toward the rear of the machine by a spring 35 tensioned between the lower end of each of the rear supporting links 28 and an angle bar extending between the side frames of the machine. At their rearward ends, the selector bars 27 of each pair are provided with bent over and downwardly depending forked extensions 37 which engage with coacting grooves provided in the hubs of a pair of selector gears 38 which are slidably and nonrotatably mounted on a square shaft 39 which is suitably journalled at its ends in the crossframe members 40, 41, and intermediate its ends is journalled in a bearing provided in an intermediate crossframe 42 extending transversely across the machine.

The selector gears 38 are arranged to cooperate with a drum-type actuator 45 secured to an actuator shaft 46 which is journalled between the crossframe members 40 and 42. The shaft is driven by a bevel gear 47 fixed to its forward end, said gear meshing with a bevel gear 48 secured to a unidirectional main drive shaft 49. Also secured to each actuator shaft 46 in a position immediately behind the first drum 45 is a second actuator drum 50 which is adapted to similarly cooperate with a pair of selector gears controlled by an adjacent bank of amount keys 20.

As is more fully shown and described in the aforementioned Patent No. 2,229,889, the drums 45 and 50 are provided with a series of mutilated actuator teeth 52 which serve to rotate the selector gear 38 by differential amounts whenever the latter are slid forwardly on the square shaft 39 and into cooperative driven relationship with the drum teeth 52. As is fully described in the last-mentioned patent, the "1" to "5" keys 20 control the selector gears associated with the forward end of the actuator drums 45 and 50, while the "6" to "9" keys control the selector gears associated with the rear end of the actuator drums. When one of the "1" to "5" keys or one of the "6" to "9" keys is depressed, its associated selector bar, or slide, 27 is moved forwardly by a differential amount through the cooperation of the key stem stud 25 with its associated inclined cam face 26, so as to cause the corresponding selector gear 38 to be differentially positioned with respect to its associated actuator drum. The actuator teeth 52 on the drums 45 and 50 will therefore rotate the selector gears 38 and the associated square shaft 39 to an extent depending upon the value of the particular keyboard key 20 which has been depressed.

Slidably and nonrotatably mounted on the rear end of each square shaft 39 is a sleeve 55 to which is secured an add gear 56 and an oppositely disposed subtract gear 57, which gears are arranged to cooperate selectively with a bevel gear 58 secured to the lower end of a coacting dial shaft 59, the latter being suitably journalled in the carriage frame 60, of shiftable numeral wheel carriage 68. Secured to the upper end of each dial shaft 59 is a numeral wheel 61 bearing the numerals from "0" to "9," which may be viewed through a suitable aperture or window 62 provided in the shiftable carriage housing 63.

Figure 4:
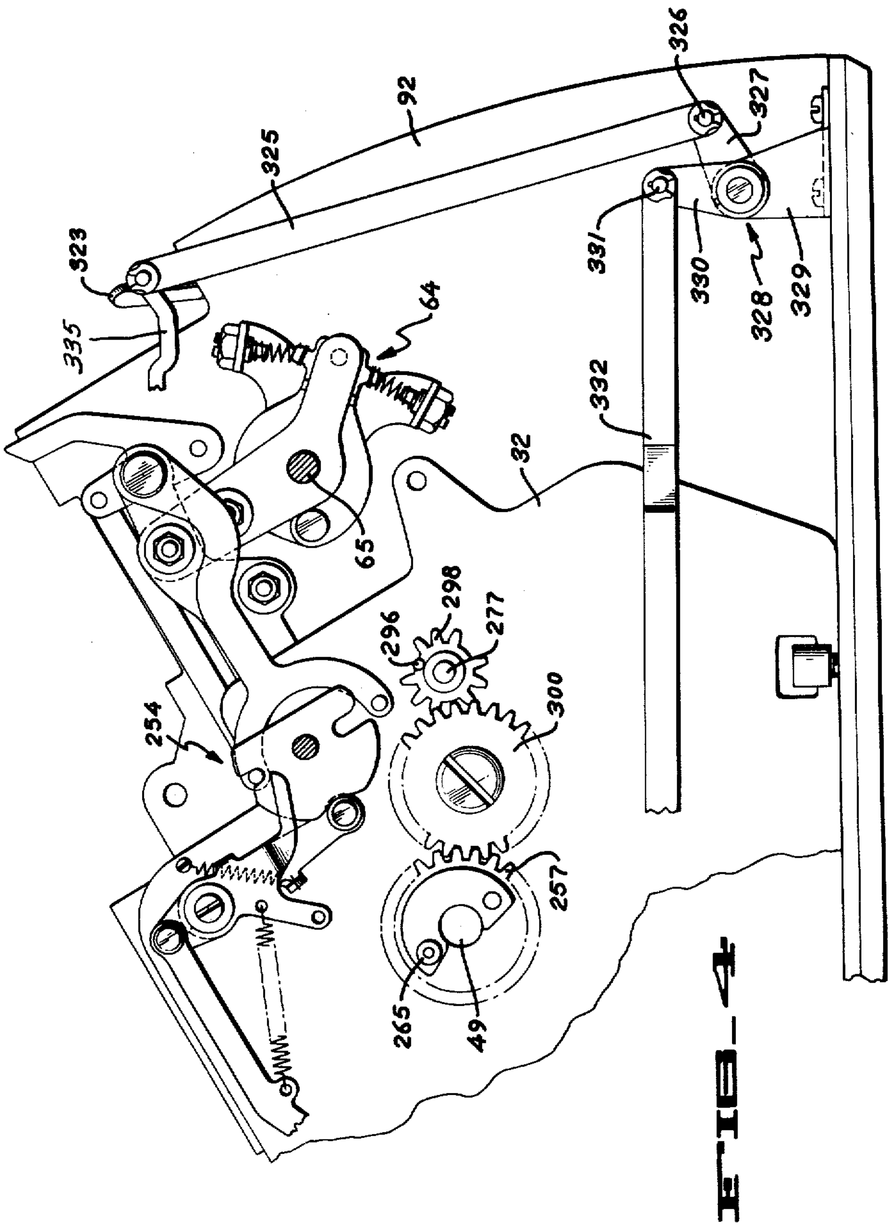
Fig. 4 is a view similar to Fig. 3 showing a portion of the control means for releasing the automatic division mechanism when the carriage is in its rightmost end position.

The add and subtract gears 56 and 57 are normally maintained in a neutral position and out of engagement with the bevel gears 58 by the action of a conventional spring actuated centralizing mechanism 64 (Fig. 4) which yieldingly tends to maintain a transverse gate control shaft 65 in the neutral position illustrated in Fig. 1. Shaft 65 is suitably journalled in the side frames of the machine and has secured thereto a pair of upwardly extending spaced arms 66 which support, parallel with the axis of shaft 65, a strap or gate 67 lying within the space existing between the add and subtract gears 56 and 57. Whenever gears 56 and 57 are maintained in their neutral position by the action of centralizer 64, as shown in Figs. 1 and 4, the numeral wheel carriage 68 may be shifted laterally across the machine without interference from add gear 56 or subtract gear 57. However, by means of mechanism to be hereinafter more fully described, the gate 67 may be moved rearwardly so as to engage add gear 56 with bevel gear 58 so that upon rotation of the actuator shafts 46 the accumulator wheels 61 will be rotated in a forward or positive direction. Similarly, in subtract operations, the gate 67 is moved forwardly so as to cause the subtract gear 57 to mesh with gear 58 and thereby cause the dial shafts 59 to be rotated in a reverse or negative direction upon unidirectional rotation of the actuator shafts 46.

*Tens-transfer mechanism*

Secured to the lower end of each dial shaft 59 just above the gear 58 is a transfer cam 70 which is adapted to cooperate with a transfer lever 71, bearing a stud 72, which is journalled in the carriage frame bar 60. Mounted on the outer end of the transfer lever 71 is a downwardly depending pin 73 which lies between a pair of flanges provided on the hub 74 of a tens-transfer gear 75 located in the next higher order of the machine. The hub 74 and the gear 75 are slidably and nonrotatably mounted on the square shaft 39 in such a manner that rotation of the gear 75 will be transmitted through the add-subtract gears 56, 57 to the coacting dial shaft 59. When an accumulator numeral wheel 61 passes from "0" to "9," or from "9" to "0," a single tooth or nose on the transfer cam 70 is operative to rock the transfer lever 71 and move the pin 73 forwardly so as to move the transfer gear 75 of the adjacent higher order longitudinally into the path of a single transfer tooth provided on a tens-transfer actuator 76 secured to the actuator shaft 46. Since pin 73 is operative to control the transfer gear 75 in the next higher order of the machine, the accumulator wheel 61 in the next higher order will be advanced one step by the tens-transfer actuator 76 in such a manner as to effect the tens-carry from one order to the next higher order as required. This mechanism is also fully described in Patent No. 2,229,889, above-mentioned.

*Revolutions counter*

Also provided in the numeral wheel carriage 68 is a series of revolutions counter wheels 80, each of which is secured to a longitudinally extending shaft 81 having its opposite ends suitably journalled in the carriage. Each of the wheels 80 is provided with a series of numerals from "0" to "9" which may be viewed through a window 83 provided in the carriage cover or housing 63. Secured to each of the shafts 81 in a position adjacent to the wheels 80 is an actuator gear 84 which is arranged to cooperate with a revolutions-counter actuator mechanism 85 mounted on a shaft 82. The actuator mechanism is adapted to be rocked into operative engagement with the aligned actuator gear 84, after which shaft 82 is translated axially to effect entry of the digit. Whenever the numeral wheel carriage 68 is in its extreme left-hand position, the rightmost revolutions counter wheel 80 will be thus advanced one step for each cycle of the machine.

This mechanism is fully shown and described in the above-mentioned Patent No. 2,229,889 to which reference may be had for a full and complete disclosure of the revolutions counter mechanism.

*Plus and minus keys*

A plus key 90 and a minus key 91 (Fig. 2), slidably mounted on control plate 32, selectively determine positive or negative registration on the carriage numeral wheels 61, and a depression of either of the keys 90, 91 serves to engage the clutch, close the motor circuit and select the sign character of the registration in the accumulator dials. The plus and minus keys 90, 91 are provided with the respective roller studs 93 and 94 (Fig. 2) which cooperate with inclined cam faces 95 and 96, respectively, formed on a gate setting slide 97. Slide 97 is pivotally connected to the upper ends of arms 98 and 101 (Fig. 2), the arm 98 being pivoted at 99 on the control plate 32, while the arm 101 is secured to and rocks the gate shaft 65. Thus, depression of plus key 90 moves the gate setting slide 97 rearwardly in such a manner as to rotate shaft 65 clockwise (Fig. 1), thereby moving gate 67 toward the rear of the machine so as to cause the add gears 56 to engage with the dial shaft gears 58. Similarly, depression of the minus key 91 brings stud 94 into engagement with the inclined surface 96, thereby causing slide 97 to move forwardly and rotate gate shaft 65 counter-clockwise (Fig. 1) so as to bring the subtract gears 57 into engagement with the dial shaft gears 58.

Figure 2:
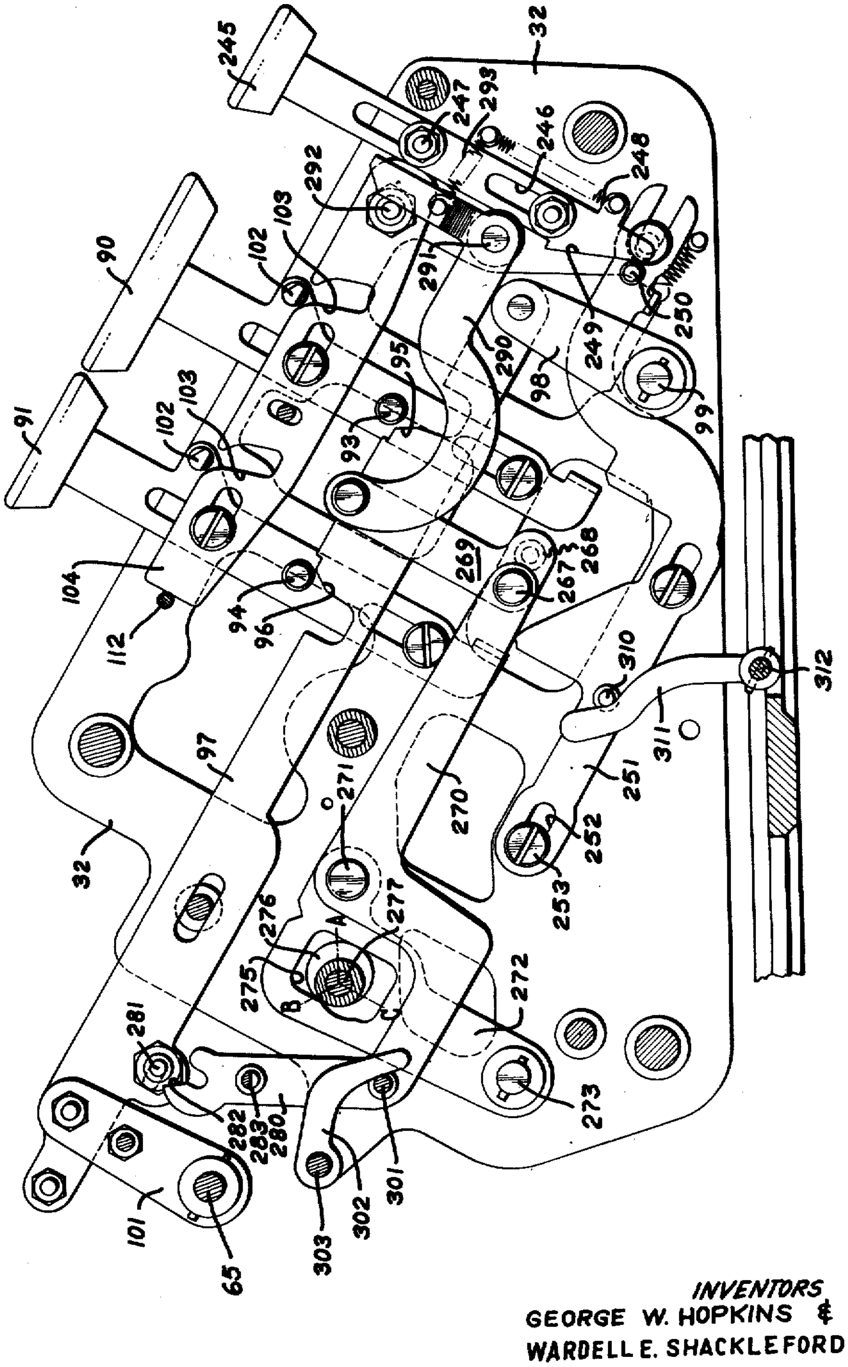
Fig. 2 is a view showing those parts of the division control mechanism which are mounted on the left-hand side of the control plate.

In order to initiate operation of the drive mechanism of the machine when either of the control keys 90 or 91 is depressed, each of these keys is provided with a half-round stud 102 which is adapted to cooperate with a cam face 103 provided on the cycle initiating slide 104 (Fig. 2). As is fully shown and described in the afore-mentioned Friden Patent No. 2,229,889, this slide 104 is cooperatively related with a clutch control lever 105 (Fig. 5) in such a manner that whenever either of the control keys 90 or 91 is depressed the slide 104 will be moved rearwardly so as to rock the clutch control lever 105 clockwise (Fig. 5) to cause engagement of the main cyclic clutch 106. Clutch control lever 105 is pivoted at 100 on side frame 92 and is also connected by a link 107 with a pivoted lever 108. The clutch control lever 105 is pivotally secured to the link 107 by a long pin 112 which extends to the right to abut the rear end of the clutch control slide 104, as shown in Fig. 2, whereby the rearward translation of the slide 104 moves the pin 112 rearwardly to rock the clutch control lever 105 to cause engagement of the main clutch 106. The lever 108 is pivotally connected, by a pin 109, extending through a suitable opening in frame 92, to a long link 110 adapted to close the normally open contacts of a micro-switch 111 (see also Fig. 6A). The switch controls current supplied to the electric motor 86 (Fig. 1) that drives the machine, the motor driving the various mechanisms through the medium of its rotor 87, the gearing shown in Fig. 5, the clutch 106, and the drive shaft 49.

*Carriage shift mechanism*

Means are provided for shifting the carriage 68 selectively in either direction for one or more ordinal steps of movement. The shifting means is preferably operated from the extended actuating shafts **46*a*** (Fig. 6) under the control of a pair of manually depressible shift keys which control shifting of the carriage for one or more steps of movement in accordance with the length of time during which such keys are maintained depressed.

Figure 5:
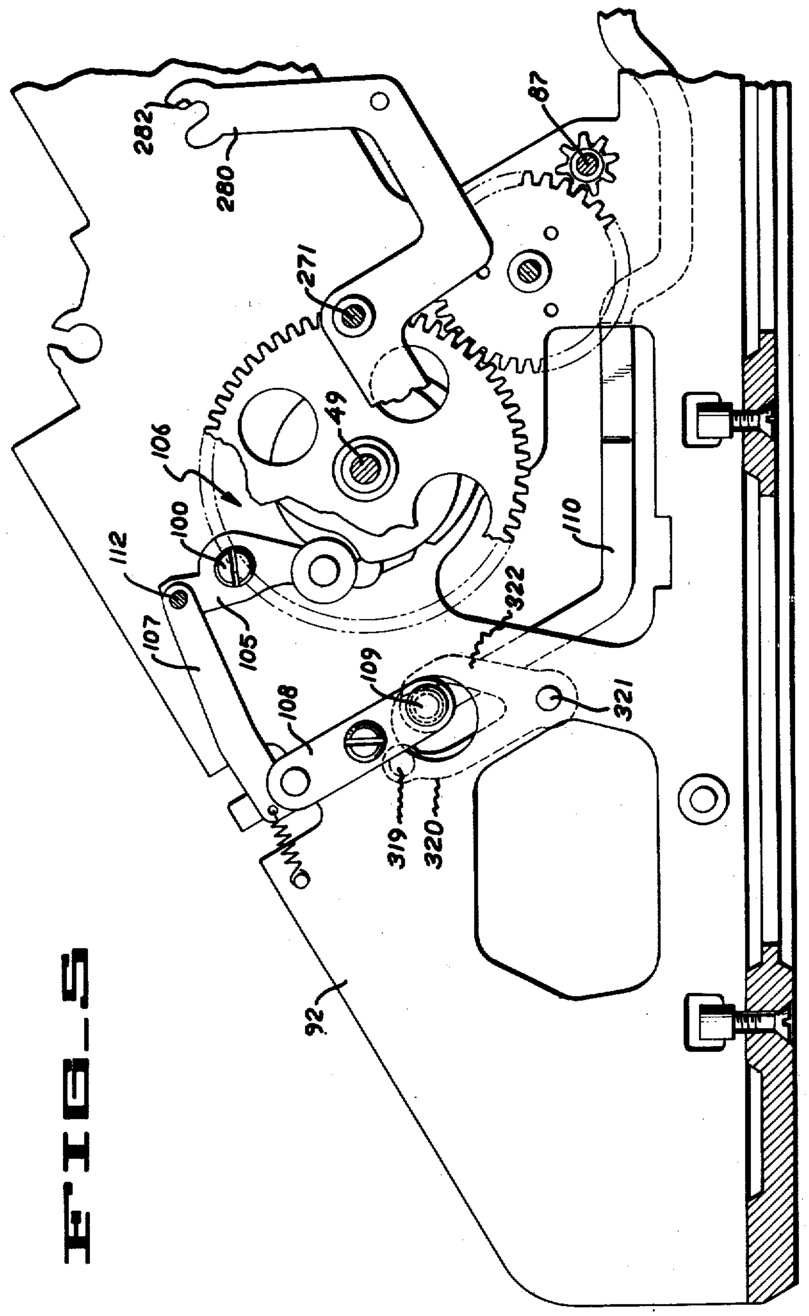
Fig. 5 is right side view of the right side frame showing the mechanism for operating the main cyclic clutch and the motor control switch.
Figure 6A:
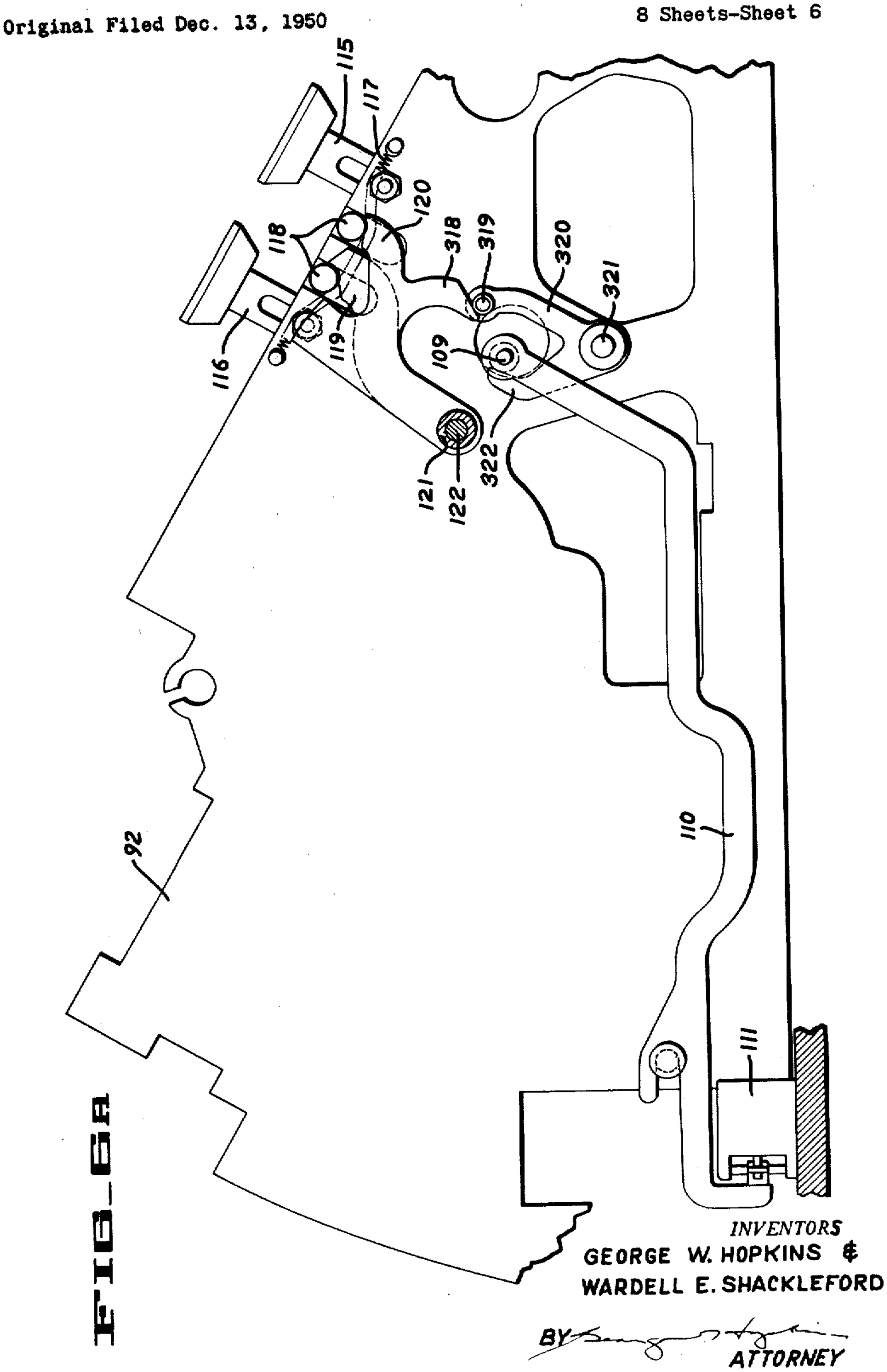
Fig. 6A is a left side view of the right side frame showing the mechanism operated by the shift control keys.

Referring now to Fig. 6A, the respective right and left shift control keys 115, 116 are suitably mounted for vertical sliding movement on the side frame 92 by suitable pin-and-slot connections and are resiliently urged upwardly to their inactive or raised positions by a suitable spring 117. Each shift key 115, 116 is provided with a pin 118 which projects on either side of the associated key, the outer end of each pin 118 being adapted to cooperate with a suitable cam surface on a claw arm, not shown, which is operatively connected to clutch control lever 105 (Fig. 5). Hence, upon depression of either shift key 115, 116 the levers 107 and 108 are rocked in the manner previously described to engage the main cyclic clutch 106 (Fig. 5) and close the normally open micro-switch 111 (Fig. 6A) for operating the driving mechanism of the machine.

Figures 6, 7:
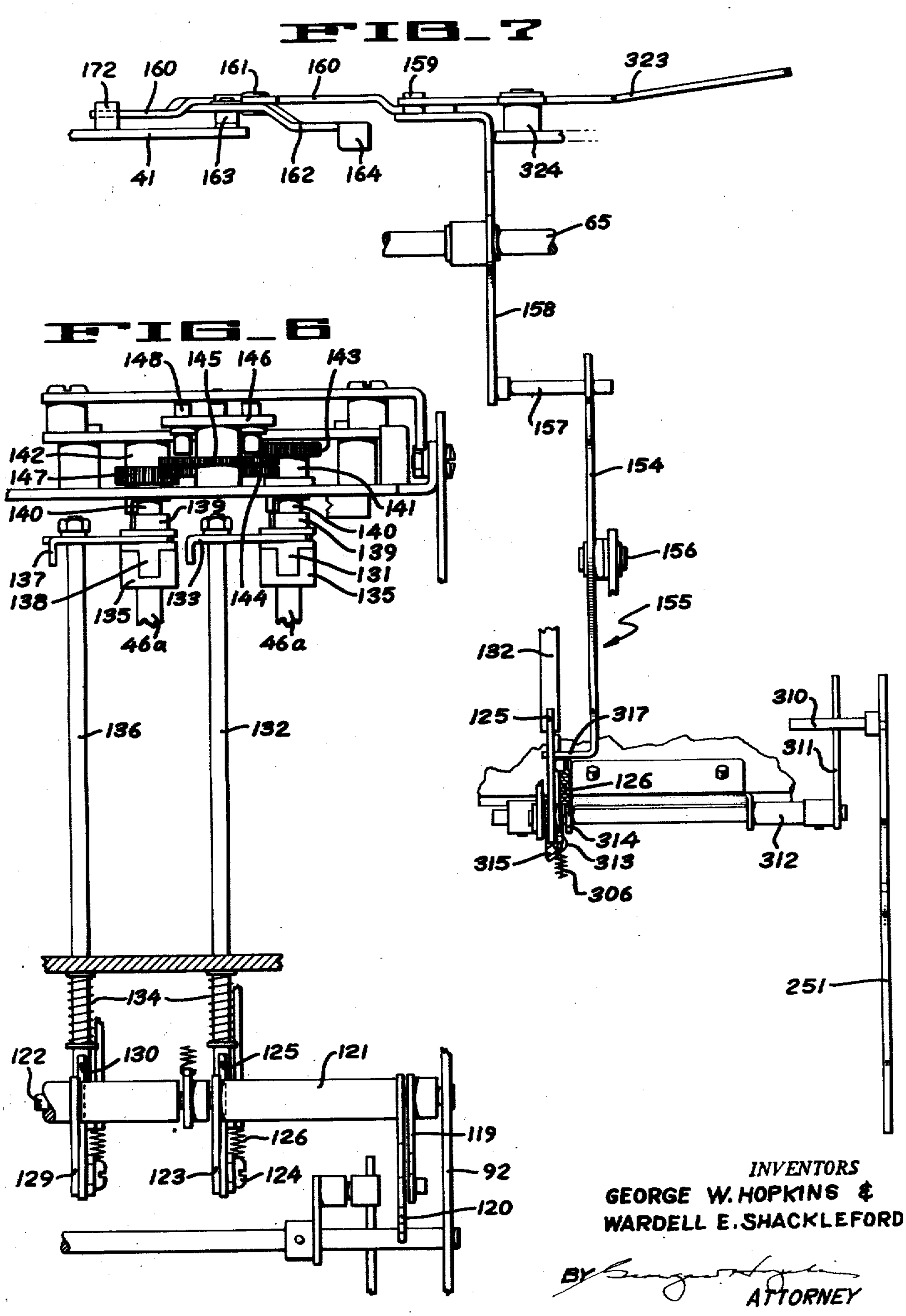
Fig. 6 is a plan view showing the carriage shift control mechanism of the machine.
Fig. 7 is a plan view of the mechanism for unlocking the right shift clutch and concurrently initiating operation of the automatic division mechanism after the carriage has reached an extreme end position.

Prior to engagement of clutch 106 and closure of micro-switch 111, each of the shift keys 115, 116 is operative to engage corresponding shift drive connections so that selective shifting of the carriage 68 in either direction for one or more ordinal positions is determined by depression and release of the respective shift keys. As shown in Fig. 6A, the inner ends of the pins 118 carried by the shift keys 115, 116 are operatively related to the rocker arms 120, 119 which are carried respectively by the sleeve 121 and shaft 122 on which sleeve 121 is pivotally mounted. As shown in Figs. 1 and 6, sleeve 121 also carries a depending arm 123 having a pin 124 thereon on which a pusher link 125 is pivotally mounted. Spring 126 urges pusher link 125 in a clockwise direction (Fig. 1) to maintain its notched end 127 in operative engagement with the forward end of a push rod 132 which is slidably mounted for endwise movement in the crossframe members 40 and 42. Thus, depression of the right shift key 115 acts through arm 120, sleeve 121, and arm 123 for causing pusher link 125 to move the push rod 132 rearwardly. Depression of the left shift key 116 acts through arm 119 to rock shaft 122 which carries a depending arm 129 similar to arm 123 on which a spring-urged pusher link 130, similar to pusher link 125, is pivoted for engagement with a left shift control rod 136 (Fig. 6).

The respective push rods 132 and 136 upon depression of the respective shift keys 115, 116 serve to enable respective drive connections from one of the extended actuating shafts **46*a* to a shift drive plate 146 in a manner now to be described. As seen in Fig. 6, each of the push rods 132 and 136 has secured to the rear end thereof the respective forked arms 133 and 137. Suitable compression springs 134 on the respective rods 132 and 136 tend to maintain each such push rod connection forwardly in clutch-disengaging position. Forked arms 133 and 137 engage respective annular grooves in shiftable drive establishing collars 131 and 138, which have endwise slidable driving engagement with coacting collars 135 (Fig. 6) secured on rearward ends of the adjacent extended actuating shafts 46*a*. The shiftable collars 131 and 138 are provided with suitable driving teeth 139 adapted for clutching engagement with the opposed driving notches 140 on the respective gear sleeves 141 and 142**.

Figure 8:
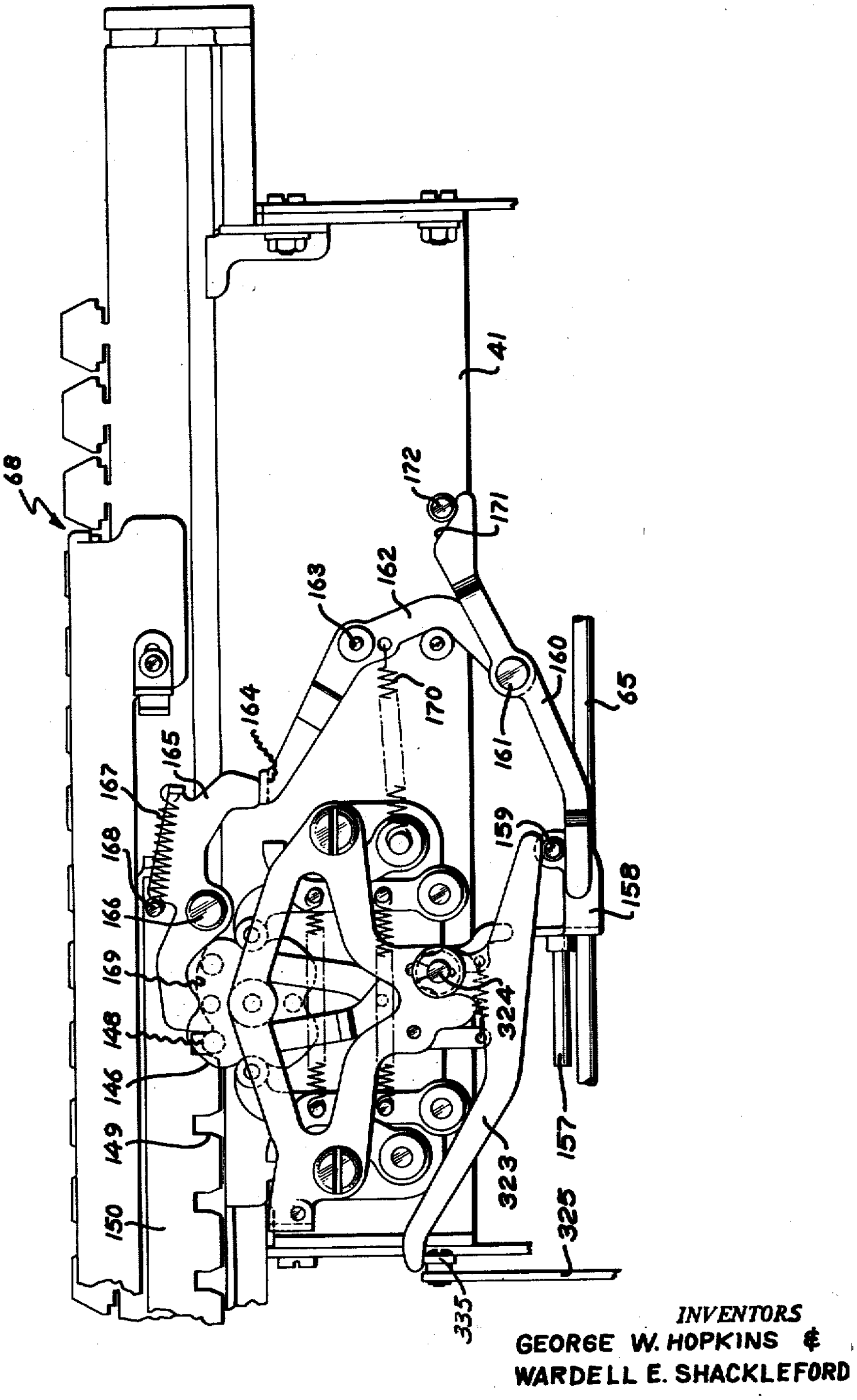
Fig. 8 is a fragmentary rear view of the machine showing a portion of the control mechanism illustrated in Fig. 7.

As shown in Fig. 6, gear sleeve 141 carries a gear 143 which meshes with a wide idler gear, not shown, which drives a large gear 144 on a compound gear assembly including a smaller gear meshing with a gear 145 on a shift drive assembly which includes the shift drive plate 146. Gear sleeve 142 carries a gear 147 which meshes directly with gear 144 on the drive gear assembly. Hence, whenever the gear sleeves 141 and 142 are driven, they serve to drive the gear train which includes the large gear 144 and shift drive plate 146 in opposite directions. Preferably this gearing provides a drive ratio of 4 to 1, so that each rotation of the gear sleeves 141 or 142 will provide a one-quarter rotation of shift drive plate 146. As is best shown in Fig. 8, plate 146 carries four equidistantly spaced shift drive pins 148 adapted for engagement with coacting notches 149 provided in a shift rack 150 secured to the back of the shiftable carriage 68. Hence, for each 90° of rotation of shift drive plate 146 the carriage 68 will be shifted through a distance equal to the spacing between the notches 149, which is equal to the distance between the numeral wheel shafts 59 of the machine. In other words, the carriage will be shifted one ordinal space for each cycle of operation of the main drive shaft 49.

The shift control arrangement is such that depression of right shift key 115 operates through its associated linkage for engaging drive tooth 139 with its corresponding notch 140 on gear sleeve 141 (Fig. 6), thus causing rotation of shift drive plate 146 in one direction to effect right-hand shifting of carriage 68. Correspondingly, depression of the left shift key 116 causes shifting of the carriage to the left by engaging tooth 139 with its corresponding notch 140 on gear sleeve 142 to rotate shift drive plate 146 in the opposite direction.

Means are provided for automatically disabling the right carriage shift operation whenever the shiftable carriage 68 reaches its extreme right end position. For this purpose mechanism is provided for automatically lifting the pusher link 125 and moving the same out of the range of push rod 132 (Fig. 1) whenever the carriage reaches its rightmost end position. The lifting of pusher link 125 against the urgency of spring 126 is accomplished by means of an arm 155 (Fig. 1) secured to a transverse shaft 156 journalled at either end in suitable brackets secured to the frame of the machine. As shown in Fig. 1, the lifter arm 155 has integrally formed therewith a rearwardly extending arm 154 in which is formed a slot that embraces a pin 157 mounted on the forwardly extending arm of a lever 158 loosely journalled on gate shaft 65. Lever 158 has a rearwardly extending arm which carries a roller 159 which lies above one end of a lever 160 (see also Fig. 8) which is pivoted at 161 on a lower end of a lever 162 pivoted at 163 on the crossframe member or rear bearing plate 41. Lever 162 has an upwardly extending arm which is provided with a formed-over ear 164 which, when the carriage is in the extreme right-hand position shown in Fig. 8, lies beneath an override pawl 165 (Fig. 8) which is pivotally mounted at 166 on the carriage shift rack 150. This pawl 165 is normally maintained in the position shown in Fig. 8 by means of a spring 167 which urges a shoulder formed on the pawl against a stud 168 on shift rack 150. When the shiftable carriage 68 reaches the end position shown in Fig. 8, the shift pins 148 engage with a cam surface 169 formed on pawl 165 and cause the pawl to be rocked clockwise against the urgency of spring 167. The lever 162 will thereby be rocked counter-clockwise against the tension of spring 170 and and cause the lever 160 to be moved toward the right as viewed in Fig. 8. Lever 160 is provided with a cam face 171 which lies beneath a roller 172 mounted on the rear bearing plate 41. Hence, when the lever 160 is moved toward the right as viewed in Fig. 8, it will be rocked clockwise thereby elevating the rear end of lever 158 so as to cause the lifter arm 155 (Fig. 1) to be raised and cause the pusher link 125 to be disengaged from the push rod 132. This will effectively disable the right shift mechanism and permit the compression spring 134 mounted on the forward end of push rod 132 to disengage the previously engaged right shift clutch and thereby terminate the right shift operation.

The foregoing description of the carriage shift mechanism is believed sufficient for a clear understanding of the instant invention, and reference is hereby made to Patent No, 2,380,642, issued to Carl M. Friden et al. on July 31, 1945, for a more detailed disclosure of this part of the machine.

*Automatic division mechanism*

The machine shown in the accompanying drawings is provided with a mechanism for enabling a dividend set up on the accumulator numeral wheels 61 to be automatically divided by the method of successive subtraction by divisor set up on the amount keys 20. As was mentioned earlier herein, the mechanism provided in the present machine for accomplishing this purpose is similar to that shown in U. S. Patent No. 2,229,889 and, therefore, only those parts of the automatic division mechanism which are directly concerned with the present invention will be described herein.

The automatic division mechanism operates to control the functioning of the machine so as to cause the divisor to be repeatedly subtracted from the dividend until an overdraft occurs in the accumulator, whereupon the overdraft is corrected and the carriage is then automatically shifted one ordinal space to the left. This sequence is continually repeated during the division operation and the number of subtraction cycles effected in each order is registered in the revolutions counter as the quotient. This division operation is controlled by the program control mechanism, which becomes effective each time an overdraft occurs in the accumulator and functions to program the operation of the add-subtract mechanism and the carriage shift mechanism in such a manner as to cause a predetermined sequence of operations during uninterrupted cyclic operation of the division mechanism. The division operation is initiated by release of a normally latched power-operated division actuator 262 (Fig. 3) in the manner to be later described. The release operation causes the program control mechanism to be operatively connected with the add-subtract gate and the carriage shift mechanism. It also renders the overdraft control mechanism effective to control the operation of the program control mechanism. All such operations are shown and described in Friden Patent No. 2,327,981, dated August 31, 1943.

Figure 3:
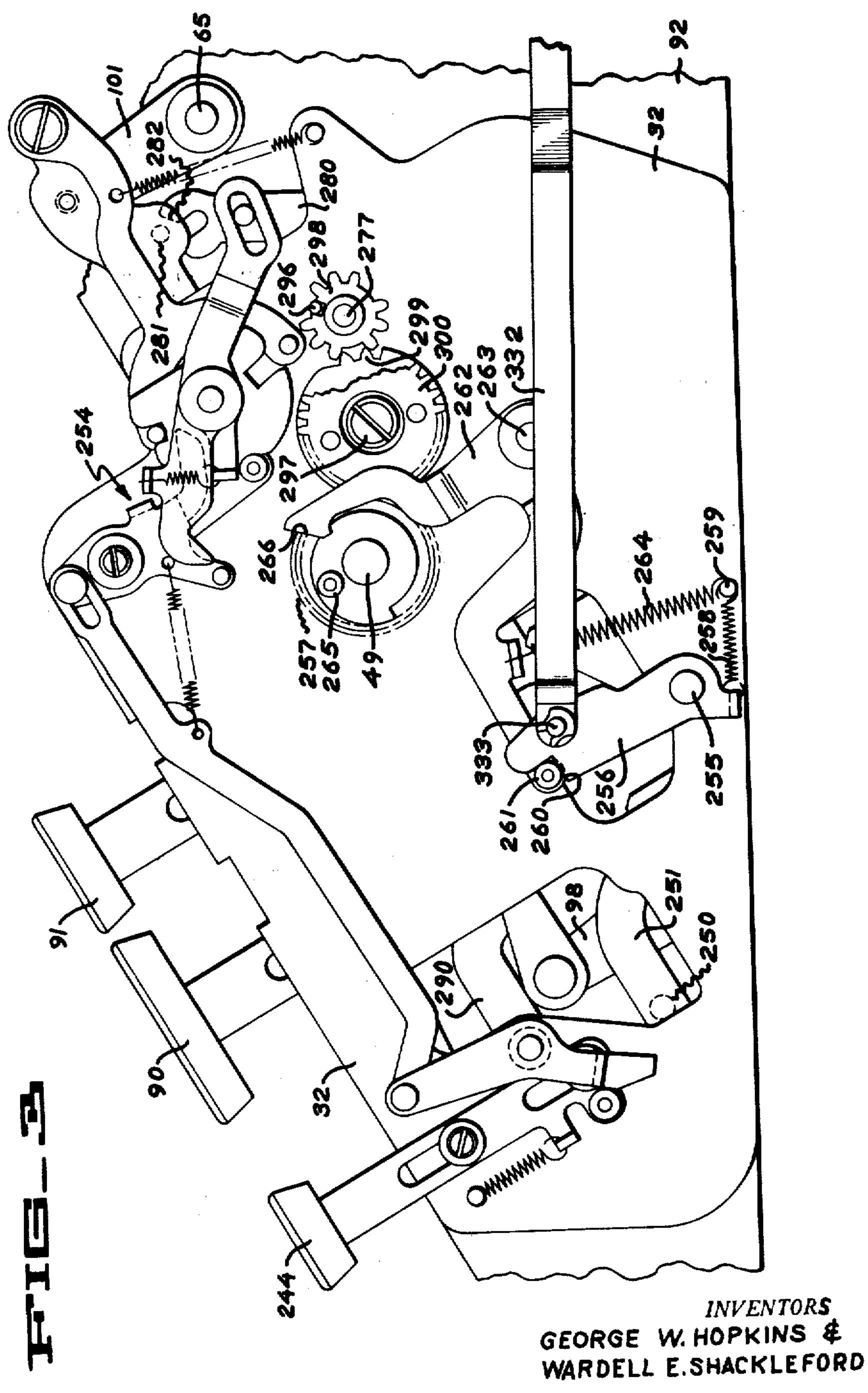
Fig. 3 is a view of those parts of the division control mechanism which are mounted on the right-hand side of the control plate.

As shown in Fig. 2, a division control key 245 is supported by a longitudinally disposed pair of elongated slots 246 for endwise sliding movement on the coacting guide studs 247 carried by control plate 32. Key 245 is normally urged to its raised position by means of a suitable return spring 248 and the key is also provided with an inclined cam face 249 which bears against a roller 250 mounted on a division control slide 251. This slide is supported for endwise sliding movement on control plate 32 by a plurality of elongated slots 252 which cooperate with studs 253 mounted on the control plate. As shown in Fig. 3, there is pivotally mounted as at 255 on the control plate a latch 256 for holding the power-operated division actuator 262 in the position shown in Fig. 3 until released by means to be later described. This latch 256 is urged counter-clockwise (Fig. 3) by the resilient action of a spring 258 anchored at one end to the lower extremity of latch 256 and at its other end to a stud 259 mounted on control plate 32. The resilient action of spring 258 normally maintains a shoulder 260 on latch 256 beneath a stud or roller 261 mounted on the forward end of the power-operated division actuator 262, which is pivotally supported on the control plate 32 by a machine screw 263. This actuator 262 is urged to rotate in a counter-clockwise direction (Fig. 3) by the resilient action of a relatively strong spring 264 tensioned between the actuator and the stud 259 in such a manner as to urge stud 261 into engagement with shoulder 260. Whenever holding latch 256 is released by mechanism to be later described, shoulder 260 is moved out of engagement with stud 261 and allows the actuator 262 to be rocked counter-clockwise by the resilient action of the relatively strong spring 264. Actuator 262 will be thereafter restored to its initial position during recycling of the machine by the cam action of roller 265 secured to the face of a gear 257 which rotates with the shaft 49. The roller 265 is operable to engage an inclined cam face 266 formed on an upwardly extending arm of the actuator in such a manner as to rock actuator 262 clockwise against the urgency of spring 264 and thereby permit holding latch 256 to re-engage with the stud 261.

Lying beneath the forward end of actuator 262 is a roller 268 (Fig. 2) carried by the lower end of a link 269 which is pivotally connected as at 267 to the forward end of a connecting lever 270, which lever is pivoted as at 271 to a follower arm 272 pivoted as at 273 on control plate 32. This arm 272 is spring-urged in a clockwise direction, as viewed in Fig. 2, and is provided with a square aperture 275 within which is located an eccentric cam 276 secured to a program controlling shaft 277, corresponding to shaft 222 in the above-mentioned Patent No. 2,327,981. As is more fully described in the patent, shaft 277 forms a part of the program control mechanism and is rotated intermittently during division operations in such a manner as to control the setting of the add-subtract gate 67 and the operation of the left shift clutch, which operations are performed in a predetermined sequence so as to cause the machine to carry out a division operation in a fully automatic manner.

Lever 270 is provided at its rearward end with an upwardly directed arm 280 (Fig. 2) which is bifurcated at its upper extremity for the purpose of engaging with a stud 281 carried by the gate setting slide 97. Thus, the release of actuator 262 (Fig. 3) for operation under the influence of spring 264 causes lever 270 to be rocked clockwise (Fig. 2). When the control shaft 277 is in the normal or home position illustrated in Fig. 2, cam 276 thereon causes arm 272 to be maintained in its most forward position. Thus when lever 270 is rocked clockwise an inclined cam face 282 provided on the rear lip of the bifurcation engages with stud 281 and forces gate setting slide 97 into its forward position so as to engage the subtract gears 57 with the dial shaft gears 58. Mounted on the arm 280 is a half-round stud 283 which is adapted to be engaged by a spring-pressed latch, not shown, so as to retain lever 270 in its operative position throughout the division operation.

Pivotally connected to the upper end of link 269 is the rearwardly extending arm of a bellcrank lever 290 which is pivotally supported at its forward end by a screw 291 secured to control plate 32. This lever 290 has an upwardly extending right angle extension which lies immediately in front of a pin 292 carried by the cycle initiating slide 104. Lever 290 is urged clockwise (Fig. 2) by a spring 293 in such a manner as to normally maintain link 269 in its raised position. In this position roller 268 engages with the underside of actuator 262 (Fig. 3) and maintains lever 270 in the normally inactive position shown in Fig. 2. Whenever the holding latch 256 (Fig. 3) releases the division actuator 262, link 269 (Fig. 2) is forced downwardly by the action of the relatively strong spring 264, thereby rocking lever 290 counter-clockwise. Rocking of lever 290 causes the upper arm thereof to push against pin 292 and move slide 104 rearwardly. This movement of slide 104, operating through pin 112 (Figs. 2 and 5) rocks clutch pawl 105 to engage the main drive clutch, and through link 107, arm 108, and link 110 (Fig. 6A) to close the power switch.

Referring now to Fig. 3, it will be noted that program control shaft 277 extends through control plate 32 and has secured to its right-hand end a small mutilated gear 298. This gear is positionable in driven relationship with a larger segmental gear 299 secured to a conventional gear 300, the latter being rotatably journalled on a screw 297 mounted on the control plate 32. Gear 300 meshes with gear 257 carried by main drive shaft 49, with the result that gear 257 drives gear 300 and the large segmental gear 299 associated therewith whenever the main clutch 106 is engaged. The small mutilated gear 298 is normally located in an inoperative position wherein it lies out of the plane of the larger segmental gear 299, which position is determined by a notch provided in gear 298 engaging over a pin 296 projecting outwardly from the control plate 32. As viewed from the front of the machine, shaft 277 and the small mutilated gear 298 carried thereby are normally urged to the left by a suitable compression spring, not shown, mounted on the left-hand end of the shaft 277. When the shaft is in its leftward position, the notch in gear 298 engages pin 296, and permits the small mutilated gear 298 to lie to the left of the large segmental gear 299. As shown in Fig. 3, gear 298 has three sets of three teeth, each set being adapted for cooperation with a single set of two teeth provided on the large mutilated gear 299. Gear 299 rotates counter-clockwise during cycling of the machine but normally does not drive mutilated gear 298 as the latter is displaced to the left thereof. However, when shaft 277 is forced to the right, the pin 296 holds gear 298 in the plane of segmental gear 299, so that the two teeth of segmental gear 299 are positioned to successively engage each of the sets of three teeth on gear 298, before the mutilated gear returns to its normal plane. Thus, when gear 298 is projected into the path of gear 299 during a division operating cycle, gear 298 will be rotated clockwise through one-third of a revolution at the end of the first complete revolution of gear 300, and also through one-third of a revolution at the end of each of the two next succeeding complete revolutions of gear 300.

A stud 301 mounted below stud 283 on lever 270 (Fig. 2) lies beneath the forward end of an arm 302 secured to a laterally extending shaft 303, which corresponds with shaft 228 in Patent No. 2,327,981, supra. It will thus be seen that as connecting lever 270 is rocked clockwise (Fig. 2), pin 301 acts through arm 302 to impart a corresponding counter-clockwise rocking movement to shaft 303, as described in Patent No. 2,327,981, supra, thereby determining operation of the overdraft responsive device associated with the automatic division mechanism of the machine. As soon thereafter as an overdraft occurs in a preselected higher order such as the twelfth order of the machine, the shaft 277 will be displaced axially so as to move the small mutilated gear 298 into the plane of the associated driving gear 299. In this manner, shaft 277 will be given three cycles of movement during the next three machine cycles, after which gear 298 will drop back over the pin 296 and be returned to its inactive position.

Whenever cam 276 occupies the position marked A in Fig. 2, which is the position of the cam when the notch in the small mutilated gear 298 engages with pin 296, clockwise movement of lever 270 (Fig. 2) causes gate setting slide 97 to be moved forwardly in such a manner as to engage the subtract gears 57 with the dial shaft gears 58. At the end of the subtract cycle in which an overdraft occurs, however, shaft 277 will be rotated counter-clockwise (Fig. 2) through 120° to the position marked B, with the result that arm 272 will be rocked counter-clockwise to move lever 270 toward the rear of the machine, thereby causing the add-subtract gate 67 to be moved to its add position. As is fully shown and described in the afore-mentioned Patent No. 2,327,981, during the next machine cycle the divisor set up on the amount keys 20 will be added back into the accumulator dials, thus correcting the overdraft, and at the end of this correction cycle shaft 277 will be rotated through another 120° to the position marked C, in which latter position cam 276 moves arm 272 to an intermediate position for determining a single order left-shift operation wherein the add-subtract gears 56 and 57 are held out of engagement with the coacting dial shafts 58 during shifting movement of the carriage.

The calculating machine is also provided with a counter reversing key 244 (Fig. 3) which lies beside division key 245 and both keys 244 and 245 are normally depressed together whenever a division operation is initiated. A depression of key 244 actuates linkage mechanism operable to cause a revolutions counter to be operated in a reverse, or negative, direction thereby enabling the subtraction cycles occurring during a division operation to be counted in a positive sense. The mechanism for accomplishing this result is indicated generally at 254 in Fig. 3 and is completely disclosed in U. S. Patent No. 2,294,111, granted to Carl M. F. Friden on August 25, 1942.

*Mechanism for initiating operation of an automatic division mechanism*

Mechanism is provided for locking the right shift clutch in active position and enabling operation of the carriage shift drive upon depression of the division control key 245, while at the same time delaying operation of the automatic division mechanism of the machine until the right shift operation is automatically terminated after the carriage reaches a predetermined position, such as its extreme right end position. For this purpose slide 251 is provided with a stud 310 (Fig. 2) which bears against an arm 311 pinned to a transverse shaft 312 (see also Fig. 1) which carries at its other end an upwardly extending lever 313. This lever has pivotally mounted thereon as at 314 a latch 315 urged counter-clockwise (Fig. 1) by a spring 309 so that an ear 308 on latch 315 tends to engage the forward edge of lever arm 313. A spring 306 having its other end secured to a fixed stud 307 tends to urge lever arm 313 counter-clockwise as viewed in Fig. 1, and the free upper end of arm 313 is adapted to bear against a pin 340 on arm 123 so as to move the pusher link 125 and right shift control rod 132 rearwardly whenever arm 313 is rocked against the tension of spring 306. Whenever arm 313 is thus rocked clockwise (Fig. 1) by shaft 312, a notch 316 provided on the rear end of latch 315 engages with a coacting ear 317 provided on the forward end of lifter arm 155, thereby locking the right shift clutch in its engaged position until the ear 317 is subsequently unlatched from engagement with notch 316 by mechanism to be hereinafter described. Whenever the right shift control rod 132 is thus moved rearwardly and latched in its clutch-engaging position, a corresponding rocking movement is imparted to sleeve 121, thereby rocking arm 120 clockwise (Fig. 6A) so that a downward projecting extension 318 thereon presses against a pin 319 on one arm 320 of a bellcrank pivoted as at 321 on the side frame 92. The other arm 322 of the bellcrank bears against the pin 109 so that clockwise movement of arm 120 imparts a corresponding rocking movement to the bellcrank, thereby causing pin 109 to be moved forwardly to rock lever 105 (Fig. 5) and concurrently close the main cyclic clutch 106 and the normally open contacts of micro-switch 111 (Fig. 6A) for enabling the carriage shift drive in the manner previously described.

It will be recalled that during the attempted overstroke of the carriage shift mechanism, which occurs after the carriage reaches its extreme right end position, the pawl 165 imparts a rocking movement to lever 160. Such rocking of lever 160 causes the inner end thereof to elevate the roller 159 and rock the lever 158 to turn the lifter arm 155 clockwise (Fig. 1). Such operation moves the notched end 127 of pusher link 125 out of holding engagement with the shift control rod 132, against the tension of its spring 126, whereupon rod 132 is moved forwardly by the return spring 134 (Fig. 6) so as to disengage the right shift clutch. Upward movement thus imparted to the roller 159 by the yieldable overtravel pawl 165 also causes roller 159 to impart a counter-clockwise rocking movement to a lever 323 (Fig. 8) pivotally mounted at 324 on the rear bearing plate 41. Such lever has its opposite end adapted for engagement with the rear end of a lever 335 (Figs. 4 and 8), which is suitably mounted on the frame plate and urged in an upward, or counter-clockwise, direction by a suitable spring, not shown. The rear end of lever 335 is pivotally connected to the upper end of a vertical long link 325, the lower end of which is pivotally connected as at 326 to one arm 327 of a bellcrank 328. Bellcrank 328 is journalled in a supporting bracket 329 suitably secured to the base plate of the machine and has an upwardly extending arm 330 pivotally connected at 331 to a long link 332 (Figs. 3 and 4) having its other end connected to a pin 333 carried by the restraining latch 256.

It will thus be seen that rocking movement imparted to the roller 159 by the overtravel pawl 165 and only releases the pusher link 125 from engagement with the forward end of the clutch control pusher rod 132 so as to disengage the right shift clutch in the manner previously described, but also causes lever 323 to be rocked counter-clockwise (Fig. 8) so that the outer end thereof depresses the long link 325. As link 325 is thus depressed, it imparts a clockwise rocking movement to bellcrank 328 (Fig. 4), thereby causing link 332 to be moved rearwardly (Figs. 3 and 4) so that the restraining latch 256 is rocked clockwise (Fig. 3) to release the notch 260 thereon from engagement with the pin 261 on the normally latched division actuator 262. In this manner, the power-operated division actuator 262 is released for movement to its active position under the urgency of the relatively strong spring 264 for initiating an automatic division operation in the manner previously described herein and in the afore-mentioned Friden Patent No. 2,327,981, which initiating movement occurs substantially at the time the right carriage shift operation is automatically terminated after the carriage reaches its extreme right end position.

*Operation*

In performing an automatic division operation on a calculating machine constructed and operated in accordance with the instant invention, the dividend is first entered into the accumulator wheels 61, either by depressing the amount keys 20 or by means of suitable twirlers secured to the tops of the wheels 61, and the divisor factor is then set up on the machine keyboard by manipulation of the keys 20. As soon thereafter as the division control key 245 is depressed, the carriage 68 is first shifted to its extreme right end position, after which initial operation the right shift of the carriage is automatically terminated and the normally-latched power-operated division actuator 262 is released so as to initiate operation of the automatic division mechanism of the machine. Upon depression of the division key 245, shaft 312 and arm 313 are rocked clockwise (Fig. 1), causing rod 132 to be moved and locked in its rearward position by engagement of latch 315 with the lifter arm 155, thereby conditioning the carriage shift mechanism for right shift operation. Immediately thereafter, the main cyclic clutch 106 and motor circuit microswitch 111 are closed, causing the carriage 68 to be shifted toward the right, at which time the power-operated division actuator 262 is retained in its normally latched position by the restraining latch 256 (Fig. 3). After the carriage 68 reaches its extreme right end position, the next machine cycle attempts to shift the carriage beyond its extreme right end position and causes an overstroke which depresses the override pawl 165 and elevates roller 159 (Fig. 8), causing the latter to rock lever 158 so as to release arm 155 from holding engagement with latch 315 (Fig. 1), while also actuating lever 323, link 325, bellcrank 328 (Fig. 4), and link 332 to rock notch 260 on latch 256 out of holding engagement with the coacting pin 261 on the power-operated division actuator 262 (Fig. 3). As arm 155 is thus rocked clockwise (Fig. 1) out of engagement with latch 315, notch 127 on pusher link 125 is moved out of the range of the forward end of push rod 132, thereby enabling spring 134 (Fig. 6) to move rod 132 forwardly (Fig. 1) so as to open the right shift clutch and terminate the right carriage shift operation. At substantially the same time, the restraining latch 256 is rocked clockwise (Fig. 3) so as to release the normally-latched division actuator 262 for counterclockwise movement under the urgency of the relatively strong spring 264, thus initiating operation of the automatic division mechanism of the machine in the manner previously described. A normal division operation will now take place in which the carriage 68 is ordinally shifted progressively toward the left throughout its entire traverse by a progressive series of subtract-add-shift operations in which the dividend factor in the accumulator is first automatically aligned with and then divided by the preselected divisor factor which has previously been entered into the keyboard of the calculating machine.

It can be mentioned that it is conventional in the machine manufactured in accordance with the above-mentioned patents, for the keys 115 and 116 which otherwise cause a carriage shift to be initiated, to be locked down until the end of a machine cycle as by latch 73 shown in Fig. 1 of said patent to Friden, No. 2,380,642. It is also conventional in this machine to provide an interlock between the shift keys 115 and 116 and the digitation slide 104 (as shown in the patent to Friden, No. 2,310,280, on page 8 thereof, lines 1 to 25, left-hand column), whereby operation of the slide 104 is positively blocked when either shifting key is depressed. Thus, it is impossible for an attempted overshifting of the carriage to the right, under the control of the right shift key 115 to initiate a division, as the blocking of the slide 104 by the shift key by the conventional interlock, prevents the control arm 270 (Fig. 2) from rocking to initiate a division. While any attempted overshifting of the carriage would operate to translate link 332 (Fig. 3) to rock latch 256 to release the division control arm 262, the unlatching of the trigger 262 is idle as blocking of arm 270 by the interlock prevents the initiation of a division operation, and the trigger is immediately restored by its associated pin 265.

We claim:

1. In a calculating machine having a register for receiving a dividend factor, a selection mechanism for receiving a divisor factor, a positionable value entering mechanism for transmitting a value set in the selection mechanism into the register, power-operated shifting means for laterally moving the said register in either direction relative to the said value entering mechanism, and an override pawl operated by an operation of the shifting means to attempt a shift of the register to the right beyond the rightmost position; the combination with an automatic division mechanism of the successive subtraction type including overdraft responsive control means for operating the shifting means to shift the register ordinally toward the left upon completion of a digitation operation in any order other than the lowest, and a normally latched power-operated member for initiating operation of said division mechanism, which comprises a control key operative to initiate a right shift operation of the said shifting means to move the said register toward its rightmost end position, means for latching the shifting means in such right shift condition, and a control means operated by said override pawl for releasing said latching means and thereby terminating the right shift operation and for simultaneously releasing said latched power-operated member and thereby initiating operation of the said automatic division mechanism and causing the same to ordinally shift the said register progressively toward the left throughout its entire traverse during division.

2. In a calculating machine having an automatic division mechanism, a carriage mounted for endwise shifting movement on the said machine, a register including a plurality of ordinally arranged numeral wheels capable of being set to represent the various digits of a dividend mounted in said carriage, an amount entering means for entering a divisor into the said register, shift drive means including normally disengaged right shift and left shift clutches operable to control lateral shifting of the said carriage toward the right or left, respectively, relative to the said amount entering means, a normally latched power-operated member for initiating operation of the said automatic division mechanism, and a manually operable division control member, the combination which comprises means operated by said division control member and operative to first engage said right shift clutch, means controlled by said control member for latching said shift clutch in engaged position, mechanism including an overtravel pawl operated in response to attempted movement of the said carriage beyond its extreme right-hand position for unlatching the said right shift clutch for return to its normally disengaged position and concurrently releasing the said normally latched power-operated member, and means operable during the division operation for automatically restoring the thus released power-operated member to its normally ineffective and latched position.

3. In a calculating machine having an automatic division mechanism, a carriage mounted for endwise shifting movement on the said machine, a register including a plurality of ordinally arranged numeral wheels capable of being set to represent the various digits of a dividend mounted in said carriage, an amount entering means for entering a divisor into the said register, means for shifting the said carraige including a right shift clutch normally biased to its inoperative position, a power-operated member for initiating operation of the said automatic division mechanism, a restraining latch operable to normally hold the said power-operated member in an inactive and full cocked position, and a manually operable member movable to institute the process of division, the combination which comprises mechanism operable upon actuation of the last-mentioned member for moving the said right shift clutch to its operative position and thereby enabling the operation of said shifting means to move the said carriage toward its rightmost end position, a latch member for latching said last-mentioned mechanism in its operative position, and means controlled by the attempted shifting of the said carriage beyond its extreme rightmost end position for concurrently unlatching said latch member to enable the said right shift clutch to return to its normal inoperative position and for moving the said restraining latch to release the said power-operated member and thereby initiate operation of the said automatic division mechanism.

4. In a calculating machine having an automatic division mechanism, a frame, a carriage mounted for endwise shifting movement on the said frame, a register comprising a series of ordinally arranged numeral wheels mounted on the said carriage, the said wheels being settable to represent the various digits of a dividend, an amount entering means mounted on the said frame for entering the divisor into the said register, means for shifting the said carriage including a right shift clutch normally biased to inoperative position, a normally latched power-operated member for initiating operation of the said automatic division mechanism, and a manually operable division control member, the combination which comprises mechanism operable by movement of said control member for releasably moving the said right shift clutch to its operative position and thereby enabling operation of the said shifting means to move the said carriage toward its rightmost end position, a latching means for holding said right shift clutch in its operative position, a yieldable overtravel pawl adapted to be moved to active position by attempted shifting of the said carriage beyond its rightmost end position, mechanism controlled by movement of the said overtravel pawl to its active position for releasing the said latching means and thus enabling said right shift clutch to return to its normal inoperative position, and means associated with said last-mentioned mechanism and operated substantially concurrently therewith for releasing the said power-operated member to initiate operation of the said automatic division mechanism.

5. A calculating machine capable of solving problems in division comprising a selection means on which the various digits of a divisor may be set, a carriage mounted for ordinal shifting movement in either direction on said machine, a normally inoperative carriage shifting mechanism including a right shift clutch and a left shift clutch, a register in said carriage containing a plurality of register dials settable to represent the various digits of a dividend, actuator means operative additively or subtractively to enter values determined by said selection means into said register, a division control mechanism including means for operating said actuator means subtractively and means responsive to an overdraft in a preselected order for operating said actuator means additively to restore the overdraft and then causing engagement of said left shift clutch, a division initiating key, and mechanism operable with said key for moving said right shift clutch to its operative position and thereby enabling operaton of said shifting mechanism, means also operable upon actuation of said key for latching said right shift clutch in its operative position, latch releasing means positioned in a predetermined right-hand ordinal position of said carriage with respect to said selection means and operated by attempted movement of said carriage beyond said ordinal position, and means operated by said latch releasing means for unlatching said latching means and simultaneously initiating operation of said division control mechanism.

6. A calculating machine capable of solving problems in division comprising a selection means on which the various digits of a divisor may be set, a carriage mounted for ordinal shifting movement in either direction on said machine, a carriage shifting mechanism including a normally inoperative right shift clutch operative to shift said carriage to the right, a register in said carriage containing a plurality of register dials settable to represent the various digits of a dividend, an actuating means operative to enter a value set in said selection means into said register, a division key, a division mechanism effective to operate said actuating means and said shifting means to divide a dividend set in said register by a divisor set in said selection means, a division control mechanism including a power-operated member for initiating a division operation and a normally operative latch for restraining operation of said member, an auxiliary control means operable in conjunction with said division key for operating said right shift clutch and thereby enabling operation of said shifting means, a latching means for holding said right shift clutch operative for a plurality of cycles, a shift terminating member operated by said shifting mechanism in an attempted shift of the carriage beyond a terminal right-hand ordinal position, and means operated by said shift terminating member for unlatching both said latch and said latching means.

7. In a calculating machine having a register for receiving a dividend factor, a selection mechanism for receiving a divisor factor, a positionable value entering mechanism for transmitting a value set in the selection mechanism into the register, power-operated shifting means for laterally moving the said register in either direction relative to the said value entering mechanism, a shift terminating member operated by said shifting means upon shifting of the register to a terminal right-hand position; the combination with an automatic division mechanism of the successive subtraction type including overdraft responsive control means for operating the shifting means to shift the register ordinally toward the left upon completion of digitation operation in any order other than the lowest, and a normally latched power-operated member for initiating operation of said division mechanism, which comprises a control key operative to initiate right shift operation of the said shifting means to move the said register toward its rightmost end position, means for retaining the shifting means in such right shift condition, and a control means operated by said shift terminating member for terminating the right shift operation of said shifting means and for simultaneously releasing said latched power-operated member and thereby initiating operation of the said automatic division mechanism and causing the same to ordinally shift the said register progressively toward the left throughout its entire traverse during division.

8. In a calculating machine having a shiftable carriage mounted for lateral shifting movement on the said machine, a plurality of ordinally arranged numeral wheels capable of being set to represent the various digits of a dividend mounted in said carriage, a selection mechanism for receiving a devisor factor, an actuating means for entering a value determined by the selection mechanism into the said numeral wheels, power-operated shifting means for laterally moving the said carriage in either direction relative to the said actuating means, an automatic division mechanism of the successive subtraction type including overdraft responsive control means for operating the shifting means to shift the carriage ordinally toward the left upon sensing an overdraft in a predetermined order, a normally latched power-operated member for initiating operation of the said automatic division mechanism, and a manually operable division control member, the combination which comprises means operable upon operation of said division control member and operative to initiate right shift operation of the said shifting means to move the said carriage toward its rightmost end position, retaining means for retaining said shifting means in said right shift condition, shift terminating mechanism operable in a predetermined right-hand position of said carriage with respect to said selection means, and means operated by said shift terminating mechanism for releasing said retaining means and terminating operation of said shifting means and for concurrently releasing the said normally latched power-operated member to initiate a division operation.

9. A calculating machine capable of solving problems in division comprising a selection means on which the various digits of a divisor may be set, a carriage mounted for ordinal shifting movement in either direction on said machine, a reversible carriage shifting mechanism including a normally disengaged clutch means selectively operable to control lateral shifting of the carriage in either direction relative to the said selection means, a register in said carriage containing a plurality of register dials settable to represent the various digits of a dividend, actuator means operative additively or subtractively to enter values determined by said selection means in said register, a division control mechanism including means for operating said actuator means subtractively and means responsive to an overdraft in a preselected order for operating said actuator means additively to restore the overdraft and then operating said clutch means to shift the carriage to the left, a division initiating key, and mechanism coacting with said key for operating said clutch means to shift the carriage to the right and enabling operation of said shifting mechanism, spring controlled means also operable upon actuation of said key for retaining said clutch means in its operative position, releasing means for said spring controlled means operated by operation of said shifting means in a predetermined right-hand terminal position of said carriage with respect to said selection means, and means operated by said releasing means for disengaging said clutch means and simultaneously initiating operation of said division control mechanism.

10. A calculating machine capable of solving problems in division comprising a keyboard on which the various digits of a divisor may be set, a carriage mounted for ordinal shifting movement in either direction on said machine, a carriage shifting mechanism including a normally inoperative right shift drive operative to shift said carriage to the right, a register in said carriage containing a plurality of register dials settable to represent the various digits of a dividend, an actuating means operative to enter a value set in said keyboard into said register, a division key, a division mechanism effective to operate said actuating means and said shifting means to divide a dividend set in said register by a divisor set in said keyboard including means to operate said shifting means at the end of an ordinal series of operation to shift said carriage to the left, a division control mechanism including a power-operated member for rendering said division mechanism effective and thereby initiating a division operation and a normally operative latch for restraining operation of said member, a control means coacting with said division key for enabling operation of said right shift drive and said shifting mechanism, means for holding said right shift drive operative for a plurality of cycles, a shift terminating member operable by said shifting mechanism for terminating the operation of the shifting means in a terminal right-hand position, and means operated by said shift terminating member for releasing both said latch and said holding means.

11. A calculating machine capable of solving problems in division comprising a keyboard on which the various digits of a divisor may be set, a carriage mounted for ordinal shifting movement in either direction on said machine, a carriage shifting mechanism including a normally inoperative right shift drive operative to shift said carriage to the right, a register in said carriage containing a plurality of register dials settable to represent the various digits of a dividend, an actuating means operative to enter a value set in said keyboard into said register, a division mechanism effective to operate said actuating means and said shifting means to divide a dividend set in said register by a divisor set in said keyboard including means to operate said shifting means at the end of an ordinal series of operations to shift said carriage to the left, a division control mechanism including a spring-powered member for initiating a division operation and a normally operative restraining means for restraining operation of said member, a control means for enabling operation of said right shift drive and said shifting mechanism, means for holding said right shift drive operative for a plurality of cycles, a shift terminating means for terminating the operation of the shifting means in a predetermined right-hand ordinal position, and means operated by said shift terminating means for releasing both said holding means and said restraining means and thereby initiating operation of said division mechanism.

12. In a calculating machine having a register for receiving a dividend factor, a selection mechanism for receiving a divisor factor, a positionable value entering mechanism for transmitting a value set in the selection mechanism into the register, power-operated shifting means for laterally moving the said register in either direction relative to the said value entering mechanism, a shift terminating means for terminating the operation of the shifting means in a predetermined right-hand ordinal position, an automatic division mechanism of the successive subtraction type for operating the value entering mechanism and the shifting means to shift the register ordinarily toward the left upon completion of a digitation operation in any order other than the lowest, and a normally latched spring-powered member for initiating operation of said division mechanism, the combination which comprises a manually operated means for initiating a right shift operation of the said shifting means to move the said register toward its rightmost end position, means for retaining the shifting means in such right shift condition, and a control means operated by said shift terminating means for terminating the right shift operation and for simultaneously releasing said spring-powered member and thereby initiating operation of the said automatic division mechanism and causing the same to ordinally shift the said register progressively toward the left throughout its entire traverse during division.

13. In a calculating machine capable of solving problems in division having a selection means on which the various digits of a divisor may be set, a carriage mounted for ordinal shifting movement in either direction on said machine, a normally inoperative carriage shifting mechanism including a right shift drive and a left shift drive, a shift terminating means positioned in a predetermined right-hand ordinal position of said carriage with respect to said selection means and operated by operation of said shifting means in said ordinal position, a register in said carriage containing a plurality of register dials settable to represent the various digits of a dividend, actuator means operative additively or subtractively to enter values determined by said selection means into said register, a division control mechanism including means for operating said actuator means subtractively and means responsive to an overdraft in a preselected order for operating said actuator means additively to restore the overdraft and then causing operation of said left shift drive, a spring-powered member for initiating operation of said division control mechanism, a latch for restraining operation of said member, and a division initiating key, the combination which comprises a mechanism operable by said key for operating said right shift drive, means for retaining said right shift drive in its operative condition, and means operated by said terminating means for terminating operation of said shifting mechanism and simultaneously operating said latch to release said spring-powered member and thereby initiate operation of said division control mechanism.

References Cited in the file of this patent

UNITED STATES PATENTS

| | | |
|---|---|---|
| 2,365,325 | Avery | Dec. 19, 1944 |
| 2,365,507 | Allen | Dec. 19, 1944 |
| 2,366,345 | Machado | Jan. 2, 1945 |
| 2,399,917 | Friden | May 7, 1946 |
| 2,408,097 | Pott | Sept. 24, 1946 |
| 2,636,677 | Gang | Apr. 28, 1953 |
| 2,653,762 | Ellerbeck | Sept. 29, 1953 |
| 2,653,763 | Hopkins | Sept. 29, 1953 |
| 2,653,764 | Hopkins | Sept. 29, 1953 |
| 2,653,765 | Machado | Sept. 29, 1953 |

U. S. DEPARTMENT OF COMMERCE

PATENT OFFICE

CERTIFICATE OF CORRECTION

Patent No. 2,809,786 George W. Hopkins et al. October 15, 1957

It is hereby certified that error appears in the printed specification of the above numbered patent requiring correction and that the said Letters Patent should read as corrected below.

Column 11, line 75, for "and only" read --not only--; column 15, line 5, for "operaton" read --operation--; line 74, for "devisor" read --divisor--; column 17, line 47, for "ordinarily" read --ordinally--.

Signed and sealed this 10th day of June 1958.

(SEAL)
Attest:

KARL H. AXLINE

Attesting Officer

ROBERT C. WATSON
Commissioner of Patents